US005118174A

United States Patent [19]

Benford et al.

[11] Patent Number: 5,118,174

[45] Date of Patent: Jun. 2, 1992

[54] METHOD TO PREVENT CHEMICAL (HCFC) ATTACK OF PLASTIC FOODLINER FROM FOAM INSULATION CHEMICALS

[75] Inventors: Arthur E. Benford, German Township, Vanderburgh County; Kenneth L. Hortin, Armstrong Township, Vanderburgh County, both of Ind.

[73] Assignee: Whirlpool Corporation, Benton Harbor, Mich.

[21] Appl. No.: 701,741

[22] Filed: May 17, 1991

[51] Int. Cl.$^5$ .............................................. A47B 81/00

[52] U.S. Cl. .................................................... 312/406

[58] Field of Search ............ 312/214; 156/238, 275.5, 156/289, 331.4

[56] References Cited

U.S. PATENT DOCUMENTS 4,190,305 2/1980 Knight et al. ...................... 312/214

*Primary Examiner*—Joseph Falk

*Attorney, Agent, or Firm*—Wood, Phillips, Van Santen, Hoffman & Ertel

[57] ABSTRACT

An insulated cabinet wall structure for a refrigeration apparatus includes an outer wall defining an inner surface and a plastic liner defining an outer surface. A laminated film is adhered to the liner sheet outer surface, the film comprising in laminated sequence an inner adhesive film layer for adhering to the liner sheet outer surface, a film of high elongation material, an additional adhesive film layer, and an outer barrier film layer. A foamed-in-place insulation is firmly bonded to the outer wall inner surface and the laminated film barrier film layer, the barrier film layer both preventing stress cracking of the liner and diffusion of insulation foam blowing agents from the insulation to the liner sheet.

18 Claims, 1 Drawing Sheet

28 34 38 26 30 24 22 32 23 36 40

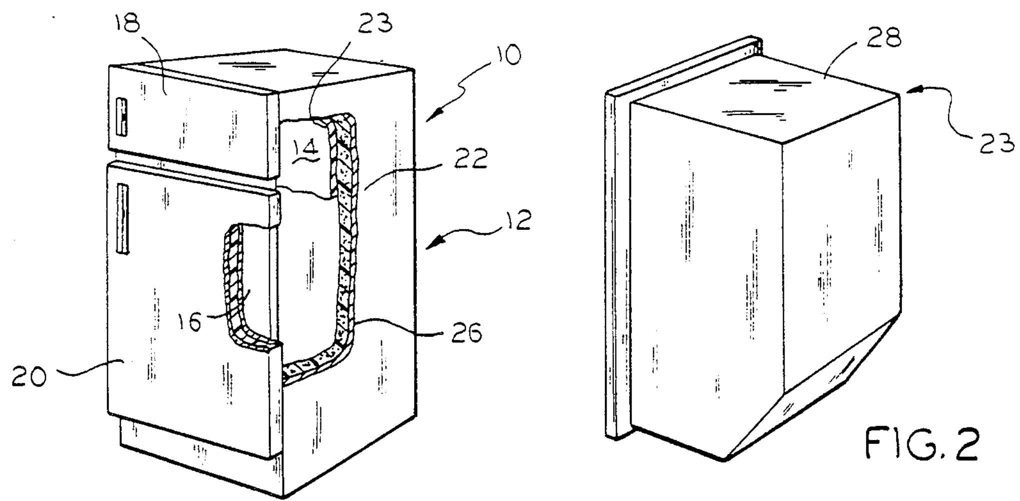
FIG.1
FIG.2
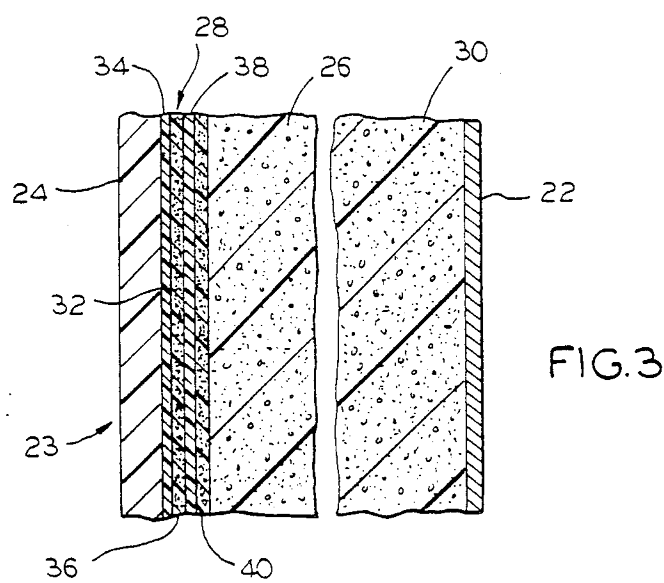
FIG.3
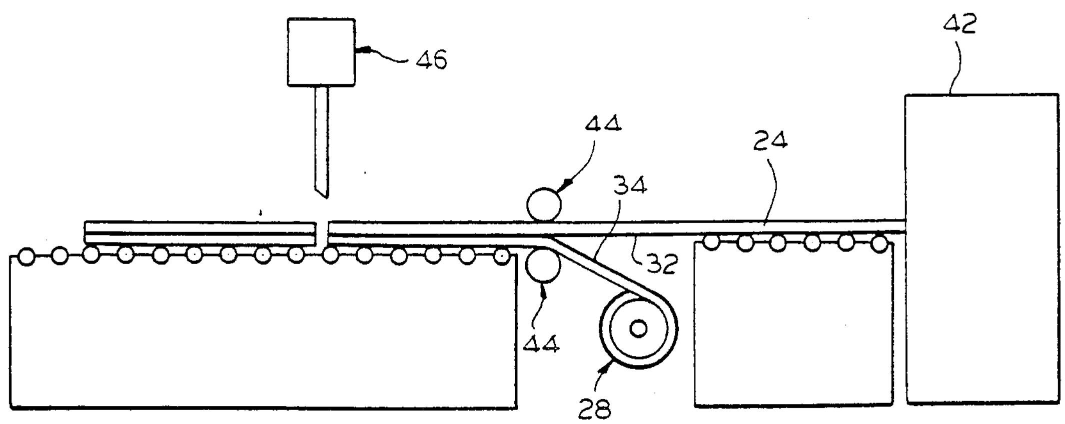
FIG.4

METHOD TO PREVENT CHEMICAL (HCFC) ATTACK OF PLASTIC FOODLINER FROM FOAM INSULATION CHEMICALS

FIELD OF THE INVENTION

This invention relates to a refrigeration apparatus cabinet and, more particularly, to a liner construction therefor.

BACKGROUND OF THE INVENTION

One conventional method of forming a refrigeration apparatus cabinet is to provide an inner liner wall and an outwardly spaced outer cabinet wall. Insulation is provided in the space between the two walls by foaming in place a foam insulation material, such as polyurethane. A problem arises in conventional such cabinet constructions in that the foam-in-place insulation tends to adhere to the liner wall. The liner wall is conventionally formed of a synthetic resin, such as high impact polystyrene (HIPS) or acrylonitrile-butadiene-styrene (ABS), etc. resins. The adhesion of the foam-in-place insulation to the synthetic liner wall can cause stress cracking thereof as a result of the differential thermal expansion of the insulation and liner wall plastic material.

Weiss et al. U.S. Pat. No. 3,960,631, assigned to the assignee hereof, disclose an improved liner construction wherein a foam release agent is provided on the plastic liner sheet prior to the forming thereof against the liner configuration to solve the above problem. Benford U.S. Pat. No. 4,707,401 addressed the problem by using a bilayer film having a controlled limited bond with a synthetic resin liner so as to effectively prevent stress cracking thereof. The film, however, further had a strong, absolute bonding to the foam-in-place insulation so that a desirable double-stress skin laminate is effectively provided.

The polyurethane foam insulation used in the above-described cabinets used a chloroflorocarbon (CFC) blowing agent. In fabricating the cabinets, CFCs are released to the atmosphere. Further, even after the cabinet is complete, CFCs can diffuse from the cabinet to the atmosphere. Recently, concern has arisen that CFCs deplete the ozone layer from the atmosphere. This damages the atmosphere since the ozone layer filters harmful ultraviolet radiation from sunlight. As a result, a strong demand has arisen to restrict the use of CFCs in refrigeration apparatus.

As a result of the above problems with CFCs, some manufacturers of refrigeration apparatus cabinets are switching to the use of polyurethane foam including hydrochloroflorocarbon (HCFC) blowing agents. However, a further problem is evident resulting from switching from use of CFC to HCFC. This problem relates to the detrimental effect to the plastic liner caused by the HCFC. Particularly, with an ABS plastic liner, the HCFC can cause brittling and cracking of the liner; while with HIPS liners, the HCFC can cause blistering. Either of these results is undesirable.

The present invention is directed to solving one or more of the problems discussed above, in a novel and simple manner.

SUMMARY OF THE INVENTION

In accordance with the invention there is disclosed a method to prevent HCFC attack of a refrigeration apparatus plastic liner.

Broadly, there is disclosed herein a method of fabricating a liner for a refrigeration apparatus insulated cabinet wherein the insulation is foamed-in-place. The method comprises the steps of providing a liner sheet having an outer surface, adhering a laminated film to the liner inner sheet outer surface, the film comprising in laminated sequence an inner adhesive film layer for adhering to the liner sheet outer surface, a film of high elongation material, an additional adhesive film layer, and an outer barrier film layer to prevent diffusion of insulation foam blowing agents and for adhering to insulation foamed-in-place thereagainst, and forming the liner sheet with the laminated film thereon into a laminar configuration with the barrier film layer disposed outwardly to provide a stronger bond between the barrier film layer and insulation subsequently foamed-in-place thereagainst then between the liner outer surface and the liner adhesive film layer to both prevent stress cracking of the liner and diffusion of insulation film blowing agents from insulation to the liner sheet.

It is a feature of the invention that the adhesive film layer comprises film formed of copolymers of ethylene and vinyl acetate.

It is a further feature of the invention that the adhesive film layers are formed of different compositions to provide a stronger bond between the film of high elongation material and the outer barrier film than between the liner sheet and the film of high elongation material.

It is another feature of the invention that the film of high elongation material comprises a film of linear low density polyethylene.

It is yet another feature of the invention that the liner sheet is formed of synthetic resin material and the liner sheet and laminated film are co-extruded.

It is still a further feature of the invention that the liner sheet is extruded at a preselect elevated temperature and the laminated film is laminated to the liner sheet while the liner sheet is at an elevated temperature.

In accordance with another aspect of the invention there is disclosed an insulated cabinet wall structure for a refrigeration apparatus including an outer wall defining an inner surface and a plastic liner defining an outer surface. A laminated film is adhered to the liner sheet outer surface, the film comprising in laminated sequence an inner adhesive film layer for adhering to the liner sheet outer surface, a film of high elongation material, an additional adhesive film layer, and an outer barrier film layer. A foamed-in-place insulation is firmly bonded to the outer wall inner surface and the laminated film barrier film layer, the barrier film layer both preventing stress cracking of the liner and diffusion of insulation foam blowing agents from the insulation to the liner sheet.

It is a feature of the invention that the outer wall is formed of metal.

Further features and advantages of the invention will readily be apparent from the specification and from the drawings.

BRIEF DESCRIPTION OF THE DRAWINGS

FIG. 1 is a front perspective view of a refrigeration apparatus with a liner formed according to the invention therein with portions broken away to facilitate of the construction of the apparatus;

FIG. 2 is a rear perspective view of the formed liner;

FIG. 3 is a fragmentary enlarged vertical section of the cabinet and

FIG. 4 a schematic side elevation of an apparatus for forming an improved liner construction embodying the invention.

DETAILED DESCRIPTION OF THE INVENTION

With reference to the drawing, a refrigeration apparatus 10 comprises an outer cabinet 12 providing a freezer space 14 and an above-freezing refrigerator space 16 selectively closed by doors 18 and 20, respectively.

The cabinet 12 is formed of an outer cabinet shell or wall 22, an inner liner 23 and a body of urethane foamed-in-place insulation 26 therebetween. The liner 23 is thermal formed into the desired liner configuration, as shown in FIG. 2, and inserted into the outer cabinet wall 22, with the insulation being foamed-in-place with the two walls held in nested, spaced relationship in a conventional foaming-in-place operation.

The invention described herein comprehends an improved, simple, low-cost liner construction which provides a select adhesion of the foamed-in-place insulation 26 thereto effectively preventing stress cracking of the liner 23 as a result of differential thermal expansion of the insulation 26 and the liner 23.

More specifically, and with reference to FIG. 3, the liner 23 comprises a plastic liner wall 24 and a laminated film 28 is adhered to the liner wall 24.

In accordance with the invention, the shell outer wall 22 defines an inner surface 30. The wall 20 is typically of metal bent to form an outer shell of the refrigeration apparatus 10. The plastic liner wall 24, which may be of ABS synthetic resin or HIPS synthetic resin defines an outer surface 32. The film 28 comprises a laminated film adhered to the liner sheet outer surface 32. The film 28 comprises in laminated sequence an inner adhesive, releasable film layer 34 for adhering to the liner outer surface 32, a film of high elongation material 36 to provide stress relief, an additional adhesive film layer 38, and an outer barrier film layer 40. The additional adhesive film layer 38 adheres the high elongation film 36 to the barrier film layer 40. The foamed-in-place insulation 26 is firmly bonded to the outer wall inner surface 30 and to the laminated film barrier film layer 40.

The adhesive film layers 34 and 38 comprise a film formed of copolymers of ethylene and vinyl acetate. The inner layer 34 is designed to adhere to the ABS or HIPS material of the liner wall 24. Each adhesive layer 34 and 38 may be on the order of one mill. or less in thickness.

The high elongation layer 36 may comprise, for example, a film of linear low density polyethylene (LLDPE). LLDPE is designed to provide an energy absorbing stress relief layer to prevent any foam cracks from propagating through to the liner wall 24. The barrier film layer 40 provides a barrier against the HCFC blowing agent from diffusing the plastic liner wall 24. The layer 40 may comprise a film of, for example, EVOH, saran, nylon, PET, PDT, etc. that would adhere to the foam insulation 26, while at the same time preventing penetration by the HCFC blowing agent.

The LLDPE film 36 may be on the order of, for example, four to eight mills. thick, while the barrier film layer 40 may be on the order, for example, two to six mills. thick.

The formation of a strong bond between the urethane foam insulation 26 and the barrier film material 40 provides improved structural integrity of the cabinet 10. The LLDPE film 36 maintains a desirable absorption of the cracking forces notwithstanding the effective bonding of the film 28 to the foam insulation 26. More specifically, it has been found that, as a result of the foaming-in-place formation of the urethane insulation, a skin of urethane is formed adhering to the confronting surface of the film 28. For any number of reasons, from time to time, cracks form in the skin causing a substantial instantaneous release of energy to the film 28 The LLDPE layer 36 attenuates the stresses owing to its ability to elongate.

To improve stress relief, it is necessary that the LLDPE film layer 36 be strongly bonded to the barrier film layer 40. Therefore, the second adhesive film layer 38 must provide a stronger bond than the inner adhesive film layer 34. In accordance with the invention, the relative composition of the two layers is such that the second layer provides a stronger bond. Under high stress conditions, however, the bond between the inner adhesive layer 34 may release from the liner wall 24 to prevent stress cracking thereof.

The laminated film 28 may be adhered to the liner wall 24 prior to the thermal forming thereof, with the bond between the inner adhesive layer 34 and the liner wall 24 being of sufficient strength to accommodate the forces generated in the thermal forming operation while maintaining the adhesion of the film 28 to the liner wall 24. However, if for any reason, the formed liner 23 is rejected, then the film 28 may be peeled off and the material of the liner reused.

In the forming process as shown in FIG. 4, the liner material 24 is provided in sheet form from an extruder 42. The laminated film 28 is fed from suitable rollers and the inner layer 34 thereof bonded to the confronting outer surface 32 of the plastic liner sheet material 24 through application of pressure as by pressure rolls 44.

The liner and bonding film composite is then cut to desired lengths by a suitable cutter 46 and thermal formed into a liner construction 23, wherein the outer surface is defined by the film 28. The thermal formed liner 23 is then inserted into the cabinet shell 22 permitting the urethane foam insulation 26 to be foamed in place therebetween and defining the wall construction illustrated in FIG. 3.

Thus, the invention broadly comprehends the provision of an improved refrigeration apparatus cabinet construction wherein a bonding film is adhered to the outer surface of the liner, prior to the thermal forming thereof, with a limited strength bond therebetween preselected to prevent stress cracking in the use of the refrigeration apparatus. It has been found that a strength between the bonding film and the liner int he range of approximately three to seven ounces per inch of width effectively provides the desired stress cracking prevention and permits removal of the film, when desired, as discussed above.

The film further includes an outer portion which is firmly bonded to the remaining portions of the film and which is firmly bonded to the foamed-in-place urethane insulation, which in turn is bonded to the inner surface of the outer metal cabinet wall. By virtue of the firm bond of the film with the insulation, an improved structural integrity of the cabinet is provided, thus permitting the use of prepainted panels and forming the outer shell having relatively low rigidity.

The foregoing disclosure of the specific embodiment illustrates the broad inventive concepts comprehended by the invention.

We claim:

1. A method of fabricating a liner for a refrigeration apparatus insulated cabinet wherein the insulation is foamed-in-place, comprising the steps of:

providing a liner sheet having an inner surface and an outer surface;

adhering a laminated film to said liner sheet outer surface, said film comprising in laminated sequence an inner adhesive film layer for adhering to said liner sheet outer surface, a film of high elongation material, an additional adhesive film layer, and an outer barrier film layer to prevent diffusion of insulation foam blowing agents and for adhering to insulation foamed-in-place thereagainst; and forming said liner sheet with said laminated film thereon into a liner configuration with said barrier film layer disposed outwardly to provide a stronger bond between the barrier film layer and insulation subsequently foamed-in-place thereagainst than between said liner outer surface and said inner adhesive film layer to both prevent stress cracking of the liner and diffusion of insulation foam blowing agents from insulation to said liner sheet.

2. The method of fabricating a liner of claim 1 wherein said adhesive film layers comprise film formed of copolymers of ethylene and vinyl acetate.

3. The method of fabricating a liner of claim 2 wherein said adhesive film layers are formed of different compositions to provide a stronger bond between said film of high elongation material and said outer barrier film than between said liner sheet and said film of high elongation material.

4. The method of fabricating a liner of claim 1 wherein said film of high elongation material comprises a film of linear low density polyethylene.

5. The method of fabricating a liner of claim 1 wherein said liner sheet is formed of synthetic resin material and said liner sheet and laminated film are coextruded.

6. The method of fabricating a liner of claim 1 wherein said liner sheet is extruded at a preselected elevated temperature and said laminated film is laminated to the liner sheet while the liner sheet is at an elevated temperature.

7. An insulated cabinet wall structure for a refrigeration apparatus, comprising:

an outer wall defining an inner surface;

a plastic liner defining an outer surface;

a laminated film adhered to said liner sheet outer surface, said film comprising in laminated sequence an inner adhesive film layer for adhering to said liner sheet outer surface, a film of high elongation material, an additional adhesive film layer, and an outer barrier film layer; and foamed-in-place insulation firmly bonded to said outer wall inner surface and said laminated film barrier film layer, said barrier film layer both preventing stress cracking of the liner and diffusion of insulation foam blowing agents from said insulation to said liner sheet.

8. The insulated cabinet wall structure of claim 7 wherein said adhesive film layers comprise film formed of copolymers of ethylene and vinyl acetate.

9. The insulated cabinet wall structure of claim 8 wherein said adhesive film layers are formed of different compositions to provide a stronger bond between said film of high elongation material and said outer barrier film than between said liner sheet and said film of high elongation material.

10. The insulated cabinet wall structure of claim 7 wherein said film of high elongation material comprises a film of linear low density polyethylene.

11. The insulated cabinet wall structure of claim 7 wherein said liner sheet is formed of synthetic resin material.

12. The insulated cabinet wall structure of claim 7 wherein said outer wall is formed of metal.

13. An insulated cabinet wall structure for a refrigeration apparatus, comprising:

an outer metal wall defining an inner surface;

a plastic liner defining an outer surface;

a laminated film adhered to said liner sheet outer surface, said film comprising in laminated sequence an inner adhesive, releasable film layer for adhering to said liner sheet outer surface, a film of high elongation material to provide stress relief, an additional adhesive film layer, and an outer barrier film layer, said additional adhesive film layer adhering said film of high elongation material to said barrier film layer; and foamed-in-place insulation firmly bonded to said outer wall inner surface and said laminated film barrier film layer, said barrier film layer both preventing stress cracking of the liner and diffusion of insulation foam blowing agents from said insulation to said liner sheet.

14. The insulated cabinet wall structure of claim 13 wherein said adhesive film layers comprise film formed of copolymers of ethylene and vinyl acetate.

15. The insulated cabinet wall structure of claim 14 wherein said adhesive film layers are formed of different compositions to provide a stronger bond between said film of high elongation material and said outer barrier film than between said liner sheet and said film of high elongation material.

16. The insulated cabinet wall structure of claim 13 wherein said film of high elongation material comprises a film of linear low density polyethylene.

17. The insulated cabinet wall structure of claim 13 wherein said liner sheet is formed of synthetic resin material.

18. The insulated cabinet wall structure of claim 13 wherein said outer wall is formed of metal.

* * * * *